United States Patent
Day et al.

(10) Patent No.: US 8,120,371 B2
(45) Date of Patent: Feb. 21, 2012

(54) OBJECT POSITION SENSING APPARATUS

(75) Inventors: Shawn P. Day, San Jose, CA (US); David Ely, Cambridge (GB); Bob L. Mackey, San Jose, CA (US)

(73) Assignee: Synaptics, Inc., Santa Clara, CA (US)

( * ) Notice: Subject to any disclaimer, the term of this patent is extended or adjusted under 35 U.S.C. 154(b) by 908 days.

(21) Appl. No.: 12/163,678

(22) Filed: Jun. 27, 2008

(65) Prior Publication Data
US 2009/0322355 A1  Dec. 31, 2009

(51) Int. Cl.
G01R 27/26 (2006.01)
G06F 3/041 (2006.01)

(52) U.S. Cl. .......................... 324/661; 324/663; 345/173

(58) Field of Classification Search .................. 324/661, 324/663; 345/173
See application file for complete search history.

(56) References Cited

U.S. PATENT DOCUMENTS

| | | | |
|---|---|---|---|
| 5,650,597 A | 7/1997 | Redmayne | |
| 5,841,078 A | 11/1998 | Miller et al. | |
| 7,030,860 B1 | 4/2006 | Hsu et al. | |
| 7,265,686 B2 | 9/2007 | Hurst et al. | |
| 7,423,635 B2 * | 9/2008 | Taylor et al. | 345/174 |
| 2004/0135775 A1 | 7/2004 | Hurst et al. | |
| 2005/0012644 A1 | 1/2005 | Hurst et al. | |
| 2006/0097991 A1 | 5/2006 | Hotelling et al. | |
| 2007/0146349 A1 | 6/2007 | Errico et al. | |
| 2007/0247443 A1 | 10/2007 | Philipp | |
| 2007/0257894 A1 | 11/2007 | Philipp | |
| 2008/0006453 A1 | 1/2008 | Hotelling | |
| 2008/0246496 A1 | 10/2008 | Hristov et al. | |
| 2009/0091551 A1 * | 4/2009 | Hotelling et al. | 345/174 |
| 2009/0194344 A1 | 8/2009 | Harley et al. | |
| 2009/0267914 A1 | 10/2009 | Dews et al. | |
| 2009/0277696 A1 | 11/2009 | Reynolds et al. | |
| 2009/0322355 A1 | 12/2009 | Day et al. | |
| 2010/0164889 A1 | 7/2010 | Hristov et al. | |

FOREIGN PATENT DOCUMENTS

EP  2045698  4/2009

OTHER PUBLICATIONS

ISA/KR, International Search Report and Written Opinion for International Application No. PCT/US2010/048319, 11 pages, Apr. 28, 2011.

* cited by examiner

*Primary Examiner* — Amy He

(57) ABSTRACT

An object position sensing apparatus including a substrate, a conductive crossbar, and a plurality of resistive elements coupled to the crossbar is described. The resistive elements are coupled to circuitry that can apply an excitation signal, such as a voltage change, to the resistive elements. For each resistive element, an electrical effect responsive to the excitation signal, such as a change in charge flowing to the resistive element, is determined. When an object is proximate to the plurality of resistive elements, the electrical effects change, and a position of the object in one or multiple dimensions can be determined from changes in the electrical effects.

33 Claims, 13 Drawing Sheets

700

```
CONCURRENTLY APPLY A VOLTAGE CHANGE TO A
PLURALITY OF RESISTIVE ELEMENTS THAT FORM
PORTIONS OF A COMB-SHAPED SENSOR
710
```

↓

```
DETERMINE THE CHANGE IN ELECTRICAL CHARGE
ON EACH RESISTIVE ELEMENT
720
```

↓

```
USE THE CHANGE IN ELECTRICAL CHARGE PER
RESISTIVE ELEMENT TO DETERMINE A POSITION OF
AN OBJECT RELATIVE TO THE SENSING REGION
ALONG ONE OR MORE DIMENSIONS
730
```

FIG. 7

OBJECT POSITION SENSING APPARATUS

BACKGROUND

Continuing advancements in electronic technology have led to the development of touch sensing technology for registering positional information and receiving user input. Within the broad category of touch sensing technology there exist capacitive sensing touch sensors, commonly referred to as capacitive touchpads (or simply touchpads) or capacitive touch screens (or simply touch screens).

In one type of conventional capacitive touchpad, capacitance sensor electrodes are arranged grid-like in rows and columns underneath a surface, with the row sensor electrodes and the column sensor electrodes separated by electrically insulating material. In one approach, a known voltage change can be first applied to the sensor electrodes of the rows, and then the sensor electrodes of the columns, in rapid succession. The touchpad has a sensing region in which it detects input. When an object is in the sensing region of the touchpad, the sensor electrodes within sensing range of the object will experience a change in the amount of electrical charge they are carrying due to capacitive coupling with the object—the sensor electrodes closest to the object will experience the largest change. The position of the object in one dimension can be determined by identifying the location associated with the column sensor electrodes experiencing the largest change in electrical charge, and similarly the position of the object in a second dimension can be determined by identifying which of the row of sensor electrodes experience the largest change in electrical charge. Alternatively, interpolation can further provide more detailed resolution of the positions. In this manner, the object's position relative to the sensing surface can be unambiguously determined.

In one method of manufacturing capacitive touchpads like the one just described, first the rows of sensor electrodes are formed on a substrate, then a layer of insulator is applied, and then the columns of sensor elements are formed on the insulator. The number of steps required can increase manufacturing costs and ultimately the cost to consumers. A capacitive touchpad that can be produced less expensively, but that can still unambiguously determine an object's position in two dimensions, would be of value.

SUMMARY

An object position sensing apparatus including a substrate, a conductive crossbar, and a plurality of resistive elements coupled to the crossbar is described. The resistive elements are coupled to circuitry that can apply an excitation signal, such as a voltage change, to the resistive elements. For each resistive element, an electrical effect responsive to the excitation signal, such as a change in charge flowing to the resistive element, is determined. When an object is proximate to the plurality of resistive elements, the electrical effects change, and a position of the object in one or multiple dimensions can be determined from changes in the electrical effects.

Because the resistive elements can be formed in a single layer on the substrate, manufacturing costs can be reduced. These and other objects of the various embodiments of the present invention and their advantages will be recognized by those of ordinary skill in the art after reading the following detailed description of the embodiments that are illustrated in the various drawing figures.

BRIEF DESCRIPTION OF THE DRAWINGS

FIG. 7 is a flowchart of a method of sensing a position of an object according to an embodiment of the present invention.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
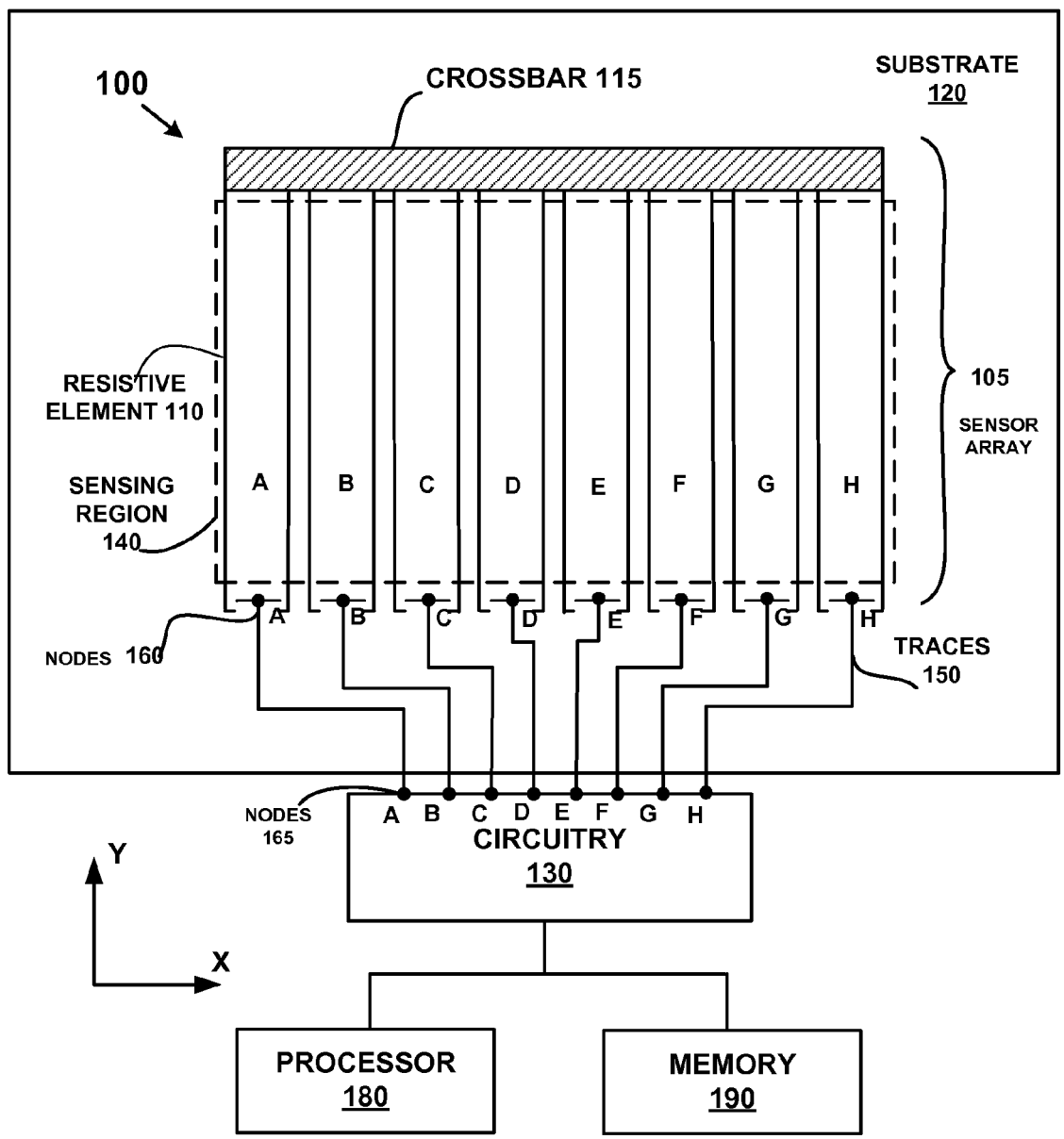
FIGS. 1A, 1B, 1C, 1D, 1E, 1F, 2, 3, 4, 5A, 5B, and 6 show elements of object position sensing apparatuses according to various embodiments of the present invention.

FIG. 1A illustrates elements of an object position sensing apparatus 100 according to an embodiment of the invention. In general, object position sensing apparatus 100, as well as the other object position sensing apparatuses described herein, can be used as an interface for an electronic device such as, but not limited to, a computing device (e.g., desktop computer, laptop computer, notebook computer), a handheld device (e.g., cell phone, smart phone, music player, game player, camera), or a peripheral device (e.g., keyboard, mouse, remote control). The object position sensing apparatuses described herein can be located anywhere on an electronic device, and generally can be integrated within the general form factor of a conventional device. Also, the object position sensing apparatuses described herein may be implemented on a planar surface of an electronic device, or they can be adapted to non-planar surfaces. The object position sensing apparatuses described herein can also be implemented using transparent or substantially transparent materials, such as ITO, thus allowing them to be implemented as a touch screen device over an image or information display device. It will be understood that many types of object position sensing apparatuses further include an insulating face sheet which overlies and protects the underlying components of the object position sensing apparatus.

In the example of FIG. 1A, object position sensing apparatus 100 includes a single sensor array 105, which in turn includes a number of resistive elements 110A-H (e.g., sensor electrodes) and a crossbar 115 that electrically connects the resistive elements 110A-H to each other as shown. The resistive elements 110A-H shown in FIG. 1A are elongate in that the length is greater than the width for each of the resistive elements 110A-H. Although FIG. 1A shows resistive elements that are much longer than they are wide, other aspect ratios are possible. For example, the resistive elements may be twice as long as wide, three times as long as wide, and the like. In many embodiments, the resistive elements will be at least twice as long as wide. Given how the resistive elements 110A-H are laid out in FIG. 1A, the lengths of the resistive elements 110A-H are measured along the y-direction and the widths of the resistive elements 110A-H are measured along the x-direction. However, it is understood that the geometry of resistive elements can vary from implementation to implementation, and the comparison of characteristic lengths and widths will vary with the geometry. It is also understood that the number of resistive elements may be different from the number shown in FIG. 1A.

The resistive elements 110A-H are also individually coupled to circuitry 130 via traces 150A-H, as shown. That is, at one end, the resistive elements 110A-H are electrically connected to each other by a crossing element (crossbar 115), while at their other ends the resistive elements 110A-H are electrically coupled to circuitry 130. In one embodiment, circuitry 130 is coupled to a processor 180 and memory 190, which may be implemented separately from or integrally with an electronic system (e.g. a computer system, input device such as a remote control, a handheld device such as a PDA or cellular phone, a media device such as a media recorder or player, and the like). In many embodiments, the electronic system has separate processors and memory from that of the object position sensing apparatus.

Figure 1B:
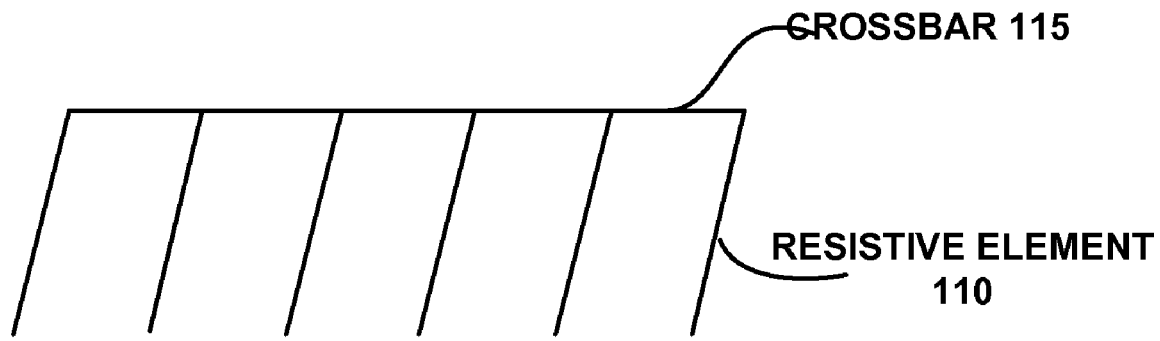
Figure 1C:
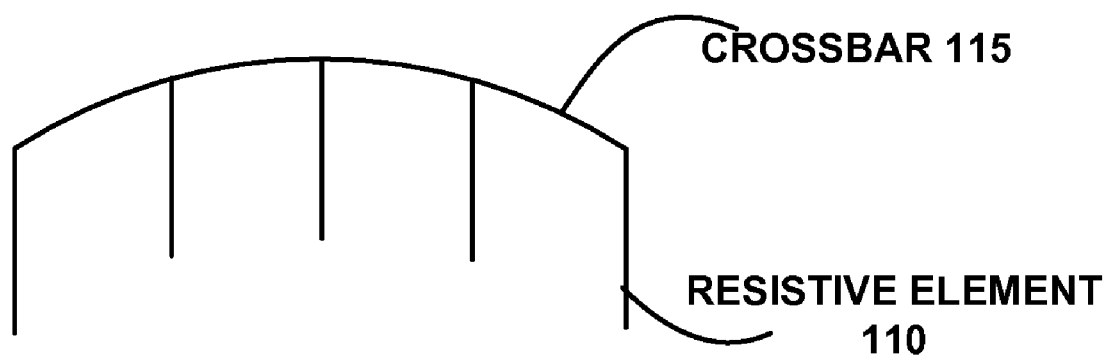
Figure 1D:
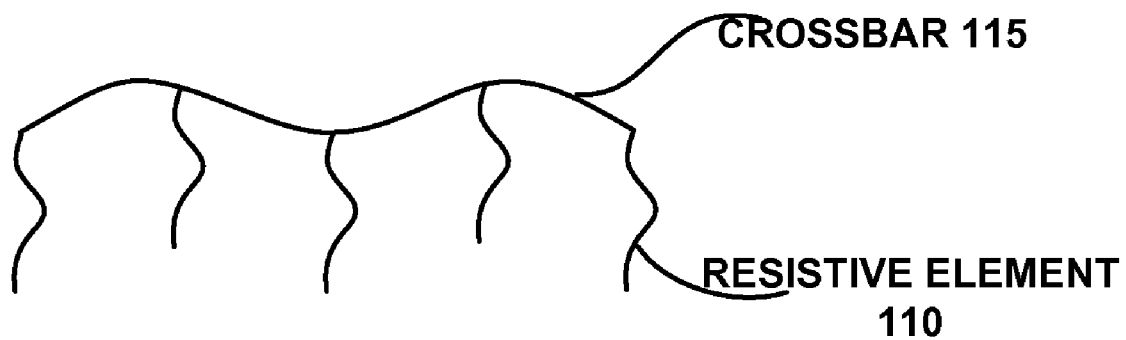

The sensor array 105 is, in many embodiments, a comb-shaped (pectinate) sensor. It is recognized that the shape of sensor array 105 may be different from the example of FIG. 1A (and the other examples described herein) but still be characterized as comb-shaped in nature. For instance, in the example illustrated in FIG. 1A, the resistive elements 110A-H are straight, the crossbar 115 is straight, and the resistive elements 110A-H are orthogonal to the crossbar 115. However, for example, the resistive elements 110A-H and the crossbar 115 do not have to be straight, nor do the resistive elements 110A-H have to be orthogonal to the crossbar 115. FIGS. 1B, 1C and 1D illustrate some other examples of sensors that are comb-shaped in nature and that function according to the same general principles as sensor array 105 of FIG. 1A (for clarity, only a few resistive elements and a crossbar are represented in FIGS. 1B, 1C and 1D). Other configurations are possible.

Figure 1E:
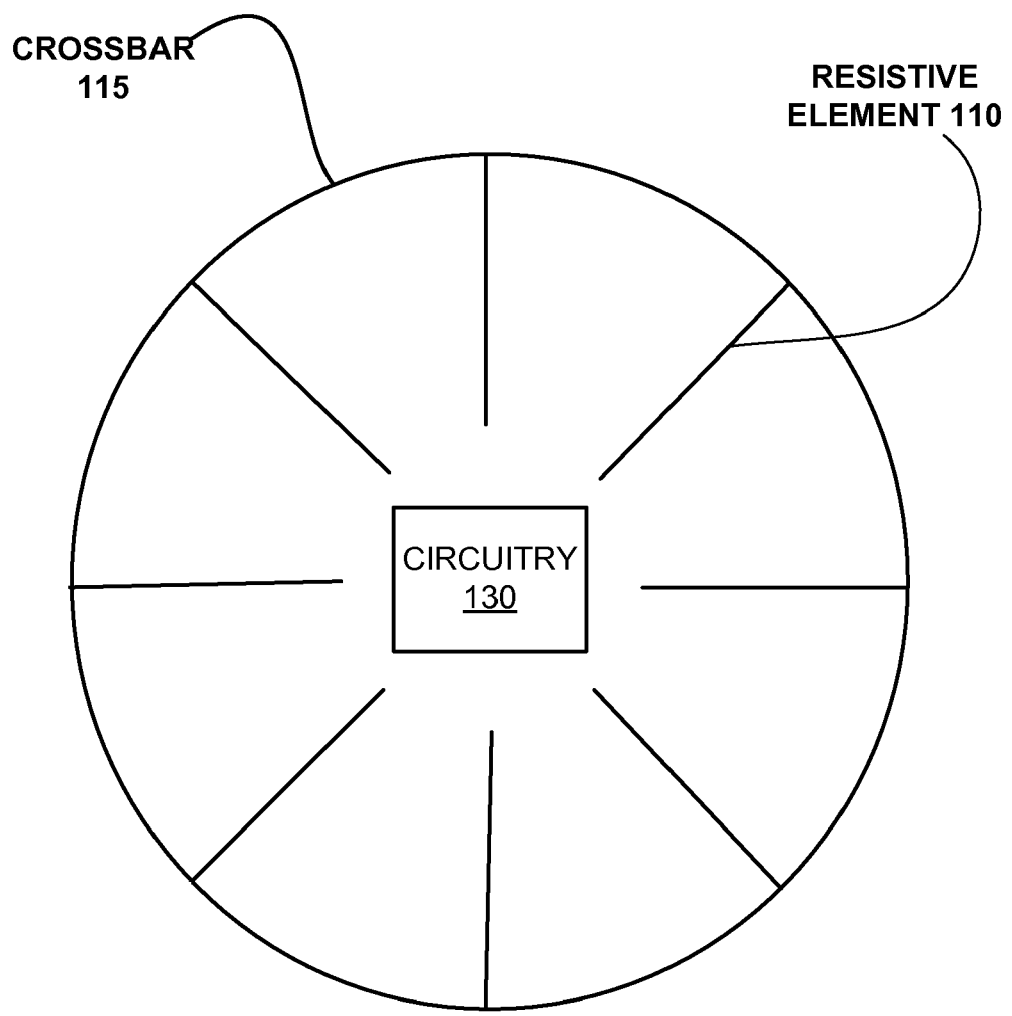

Additionally, sensor array 105 may be star-shaped. For example, FIG. 1E demonstrates an embodiment in which sensor array 105 may be star-shaped; resistive elements 110A-H (coupled with crossbar 115) may fan inwards toward a central region. In FIG. 1E, circuitry 130 is shown as located in the central region, while the resistive elements 110A-H surround and couple with circuitry 130; however, circuitry 130 can be located elsewhere and not change the shape of the sensor array. Additionally, FIG. 1F demonstrates an embodiment in which sensor array 105 may be star-shaped with resistive elements 110A-H fanning outwards and surrounding crossbar 115. Similarly, the circuitry associated with the sensor array 105 shown in FIG. 1F may be located in a central region (e.g. within the circle traced by the crossbar 115) or elsewhere. Moreover, one end of each resistive element 110A-H couples with crossbar 115, while the other end of each resistive element 110A-H couples with circuitry 130.

The resistive elements 110A-H traverse a sensing region 140 and can be used to determine the position within the sensing region of one or more input objects proximate to the sensor array and in the sensing region ("proximate object(s)"). Examples of input objects include users' fingers, styli, probes, and the like. Thus, when an object is brought into sensing region 140, the position of that object relative to the coordinate system in use can be determined. A Cartesian system is shown in FIG. 1A as an example, and other systems can be used.

As used herein, "sensing region" 140 is intended to broadly encompass any space above, around, in and/or near the sensor array 105 where the sensor electrodes are able to detect an input object. In a conventional embodiment, sensing region 118 extends from a surface of the touchpad in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions 140 can vary widely from embodiment to embodiment.

In the example of FIG. 1A, the crossbar 115 is situated outside of the defined sensing region 140. Although a sensing region 140 with a rectangular two-dimensional projection is illustrated in FIG. 1A, the present invention is not so limited. For example, depending on the design of the sensor array and surrounding circuitry, shielding, and the like, sensing regions 140 can be made to have two-dimensional projections of other shapes. A sensing region 140 with a circular projection can easily be supported by the sensor array shapes shown in FIGS. 1E and 1F, for example. Alternatively, proper shielding positioned between the sensor array 105 shown in FIG. 1A and any input objects can result in a sensing region with a circular projection even though the sensing array 105 appears to be the roughly rectangular.

Additionally, through proper sensor design and signal manipulation, the sensing region 140 can effectively be made to extend a short or a long distance in the third dimension (extending in and out of the page in FIG. 1A). With a sufficiently short distance from the sensor array 105, the sensing region may almost extend to as minimum a distance as possible from sensor array 105 such that input may be recognized and acted upon only when there is physical contact between any input objects and a surface associated with the sensing region. For example, input may be recognized only when an input object makes contact with a defined surface of an object position sensing apparatus 100. Alternatively, the sensing region may be made to extend a long distance from the sensor array 105, such that an input object positioned some distance away from a defined surface of object position sensing apparatus 100 may still be recognized and acted upon. Therefore, interaction with object position sensing apparatus 100 may be either through contact or through non-contact proximity.

In the example of FIG. 1A and the other examples illustrated herein, the widths of the resistive elements 110A-H (measured in the x-direction in FIG. 1A) are uniform along the length of each resistive element, and the widths and the spaces between resistive elements are the same between elements (at least within specified design and/or manufacturing tolerances). However, the present invention is not limited to such a geometry—that is, the resistive element geometry may be symmetric or asymmetric. Correction factors to account for any lack of symmetry, or to account for variations in the dimensions or electrical properties of the resistive elements 110A-H, can be empirically determined or theoretically approximated and applied when determining an object's position.

The dimensions and spacing of the resistive elements 110A-H are implementation-specific but, in general, are discrete enough such that the position of an object that is proximate to the sensing region 140 can be determined. That is, the resistive elements 110A-H are spaced closely enough with respect to each other to determine a position in the x-direction within a desired degree of accuracy, and are close enough so that an object cannot be hidden between them.

The traces 150A-H are typically made to have much lower resistance than the resistive elements 110A-H. In one embodiment, the resistive elements 110A-H are made of a material having a relatively lower conductivity (such as, but not limited to, ITO) while the traces 150A-H are made of a highly conductive material (such as, but not limited to, silver ink, carbon ink, or copper). The substrate 120 is made of an appropriate substrate material, such as, but not limited to, polyethylene terephthalate (PET). In another embodiment, the resistive elements 110A-H and traces 150A-H are made of materials with similar resistivity and geometry is used to produce the resistance difference. For example, each one of the resistive elements 110A-H is traced out and filled in by a long, thin line of conductive material instead of a solid rectangular chunk of conductive material to generate an overall higher resistance for resistive elements 110A-H. In yet another embodiment, some combination of material characteristics and geometry are used to produce the desired resistances.

Circuitry 130 can be used to apply a voltage swing to each resistive element 110A-H simultaneously, and can also determine the charge required to drive the entire unit to the specified voltage through each trace. The charge required to drive the entire unit to the specified voltage through each trace may be directly measured, or extrapolated from other measurements. For example, measurements can be taken before steady state, and appropriately adjusted with factors derived from known time constants to estimate the charge required to drive the entire unit to the specified voltage. Thus, for example, circuitry 130 can concurrently drive a same (known) voltage change onto all of the resistive elements 110A-H, and can measure the charge transferred onto each of the resistive elements. The sensor array 105 is configured such that the charge transferred onto each of the resistive elements varies in response to motion of an object in the sensing region, or an object being in the sensing region (versus not being in the sensing region). Thus, circuitry 130 can also be configured to determine the position of an object in the sensing region in one or more dimensions based on an amount of charge flowing to each of the resistive elements 110A-H.

More specifically, if the resistive element geometry is symmetrical, then substantially equal baseline charges Qi (where i=iA through iH) will be transferred onto all of the resistive elements 110A-H in the absence of a proximate object. Correction factors can be applied to compensate for variations in electrical properties that might affect the charge per resistive element. If the resistive element geometry is asymmetrical, then the baseline charge Qi that is transferred onto each resistive element 110A-H in the absence of a proximate object may be different across the resistive elements. In either case, the baseline charge per resistive element can be measured, and a measure of the baseline charge per resistive element (e.g., a voltage a digital representation of the charge) can be stored for subsequent use. It is understood that, just as a voltage may be applied to a resistive element and a change in current or charge measured, instead a current or charge may be applied and a resulting voltage change measured.

The presence of a proximate object will increase the transferred charge by an amount, $\Delta Qi$, relative to the baseline charge Qi. The increase in the transferred charge occurs as a result of the additional capacitance introduced by the proximate object. Due to the resistances associated with the sensor array 105 (e.g., the resistances associated with the resistive elements 110A-H and the crossbar 115), the presence of a proximate object will generally cause an unequal change, $\Delta Qi$, in the transferred charge Qi per resistive element.

Generally speaking, given the layout shown in FIG. 1A where the resistive elements 110 generally extend along the y-direction and are spaced along the x-direction, the profile of $\Delta Qi$ versus resistive element can be used to unambiguously determine the position of an object in the x-direction. For example, the system can be designed to determine the position of the object as the x-coordinate corresponding to the peak of the profile in the x-direction. That is, resistive elements closer to the object will experience larger increases in currents due to lower resistance between circuitry 130 and the object and will therefore experience a larger $\Delta Qi$ than resistive elements further from the object. Thus, in one embodiment, the position of an object in the x-direction can be determined by identifying the location associated with the resistive element that experiences the largest $\Delta Qi$.

In another embodiment, the position of the object in the x-direction may be more precisely determined by also considering the $\Delta Qi$ associated with at least one other resistive element that is proximate to the resistive element that experiences the largest $\Delta Qi$, and then interpolating an x-coordinate that lies within the range encompassed by the neighborhood of resistive elements. In many cases, the $\Delta Qi$ associated with at least the resistive elements adjacent to the resistive element that experiences the largest $\Delta Q$ would be used. For example, if resistive elements 110C, 110D and 110E experience a $\Delta Qi$ of +5, +6 and +3, respectively (in arbitrary units of measurement), then the object is more accurately located as being between resistive elements 110C and 110D than at resistive element 110D.

Continuing with reference to FIG. 1A, the position of a proximate object in the y-direction can be unambiguously determined by looking at a suitable ratio such as the ratio nK/L, where n is the number of resistive elements (i.e., the "total count" of resistive elements), K is the $\Delta Qi$ of a resistive element i being insubstantially capacitively influenced by the object to be sensed (i.e., a variation in the amount of charge flowing to one of the plurality of resistive elements substantially capacitively uninfluenced by said object), and L is the sum of all $\Delta Qi$'s for the n resistive elements (i.e., L substantially totals all variations in the amounts of charge flowing to each of said plurality of resistive elements) Depending on the circumstances, the "substantially uninfluenced" resistive element may be one not capacitively influenced by the object at all, be one that is the least capacitively influenced by the object, or be one that is negligibly capacitively influenced by the object, depending on circumstances. It is understood that the $\Delta Qi$ can be measured for positive charge or negative charge, depending on the notation used.

In some embodiments, additional factors are used in the ratio, such as to adjust K or L appropriately, such as to extrapolate maximum change in charge transferred that may result if measurements are taken before steady state is reached. Ratios with such adjustments are still basically ratios comparing nK with L. Thus, the comparison used to determine the position along the applicable dimension would still be based on a ratio comparing n*K to L In another embodiment, the determination of the y-coordinate is simplified by the addition of another trace element, as described further in conjunction with FIG. 3 below.

Continuing with reference to FIG. 1A, the measured position of a proximate object may be sensitive to the uniformity of electrical properties (e.g., the resistance) of the resistive elements 110A-H and crossbar 115. However, some variations in resistance, for example, can be compensated for by determining the actual resistance of each element of sensor array 105 and then applying suitable correction factors when computing the object's position. For example, a direct current (DC) resistance test can be used to collect information that can be used to determine the correction factors. For example, the series resistance of crossbar 115 and resistive elements 110A and 110H can be determined by measuring the resistance from node 160A to node 160H. Similarly, the resistance of resistive element 110A up to crossbar 115, plus the segment of crossbar 115 between resistive elements 110A and 110B, can be measured by passing a current from node 160A to node 160H and measuring the electromotive force (EMF) between node 160A and node 160B. In most embodiments, the resistance of traces 150 will be negligible in comparison to those of resistive elements 110. In these cases, the resistance measurements can be taken at nodes 165 instead of nodes 160. Alternatively, where the resistances of traces 150A-H are not negligible but are known or can be estimated, the resistance measures can also be taken at nodes 165 instead of nodes 160, and the measured results compensated appropriately. These types of measurements can be repeated for each of the resistive elements 110A-H.

Figure 2:
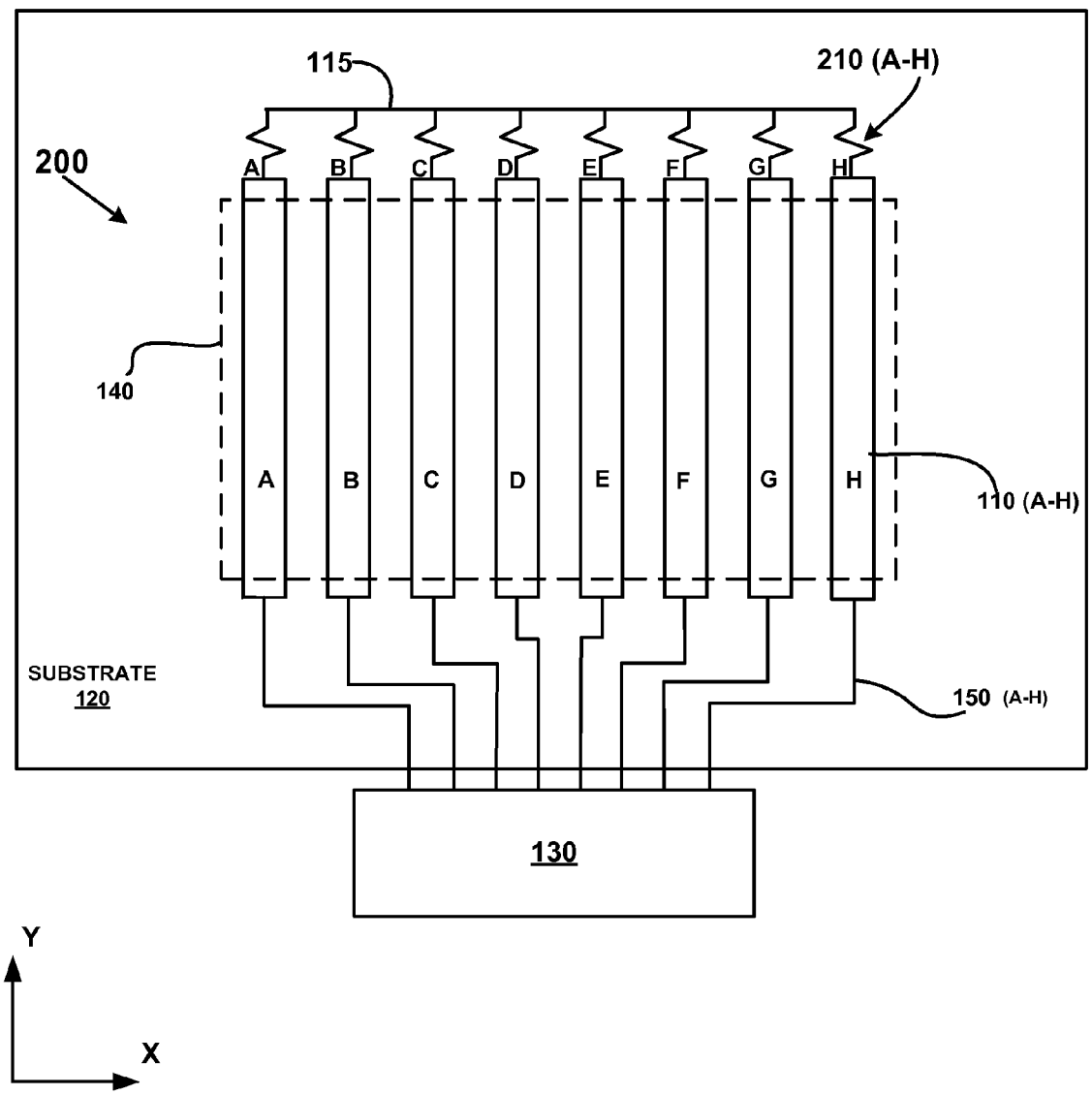

FIG. 2 illustrates elements of an object position sensing apparatus 200 according to another embodiment of the invention. In comparison to the embodiments described above, object position sensing apparatus 200 includes electrical resistors 210A-H that are introduced between the resistive elements 110A-H and the crossbar 115, as shown in FIG. 2. In the configuration shown in FIG. 2, the electrical resistors 210A-H are in series with the resistive elements 110A-H In one embodiment, the resistances associated with the electrical resistors 210A-H of FIG. 2 are less than the resistances associated with the resistive elements 110A-H. In one such embodiment, the resistances associated with the electrical resistors 210A-H are at least a significant fraction of the resistances associated with the resistive elements 110A-H. For example, the resistances associated with the electrical resistors 210A-H may be on the order of about one-half the resistances associated with the resistive elements 110A-H. The addition of the electrical resistors 210A-H makes it easier to determine the x-position of an object that is located near the ends of the resistive elements 110A-H closest to crossbar 115. In one embodiment, the electrical resistors 210A-H and the resistive elements 110A-H are made of the same material, but the resistances associated with the electrical resistors 210A-H are made different from the resistances associated with the resistive elements 110A-H by appropriate patterning of the material.

Figure 3:
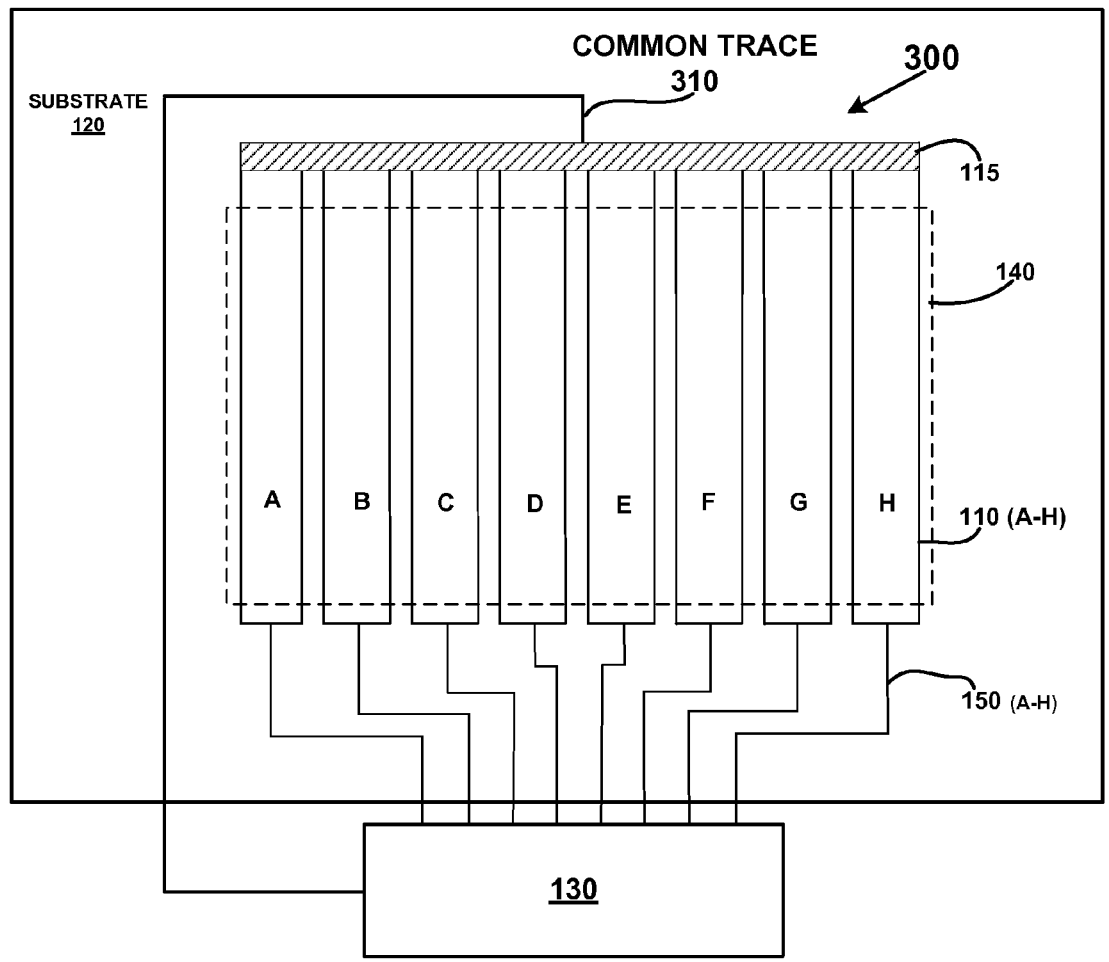

FIG. 3 illustrates elements of an object position sensing apparatus 300 according to another embodiment of the invention. In contrast to object position sensing apparatus 100 of FIG. 1A, the example apparatus of FIG. 3 includes a common trace 310 that is routed outside the sensing region 140, and is connected to circuitry 130 and to conductive crossbar 115. The circuitry 130 of object position sensing apparatus 300 is capable of driving a voltage change and measuring a resulting charge, $Q_\varnothing$ ($Q_\varnothing$ is the charge that flows through the common trace 310 that connects with crossbar 115). In most embodiments, the common trace 310 is made of a material with low impedance compared to the material used in the resistive elements 110A-H. In one embodiment, common trace is made of the same material as traces 150A-H, such as, for example, copper or a conductive ink. Although shown to be routed outside of the sensing region 140, the common trace 310 can be routed in the sensing region if it will not be substantially affected by an input object within sensing region 140. For example, the common trace 310 can be shielded from any input objects. As another example, the common trace 310 can be made "thin," such that the area available for capacitive coupling to any input objects is relatively small.

In the example of FIG. 3, the position of a proximate object in the x-direction can be determined as described above in conjunction with FIG. 1A. The position of a proximate object in the y-direction can be determined by comparing an estimate of the total variation in the amount of charge flowing through traces 150A-H to resistive elements 110A-H without flowing through the common trace 310 with an estimate of the variation in a total amount of charge flowing through the common trace 310 to said plurality of resistive elements. Many such comparisons are possible, and some ratios are listed here as specific examples, using the notation where M is the change in charge transferred onto the common trace 310 in the presence of the object, and N is the sum of all of the changes in charges transferred onto the resistive elements 110A-H in the presence of the object. Ratios of N:(M+N), M:(M+N), M:N, (M−N):(M+N), (N−M):(M+N), are all examples of viable comparison options, and can be implemented as divisions or in some other manner. To correct for non-uniformities, y-coordinates can be determined empirically for different values of this ratio, and then a y-coordinate can be interpolated for a given value of the ratio when an object is within sensing range.

Figure 4:
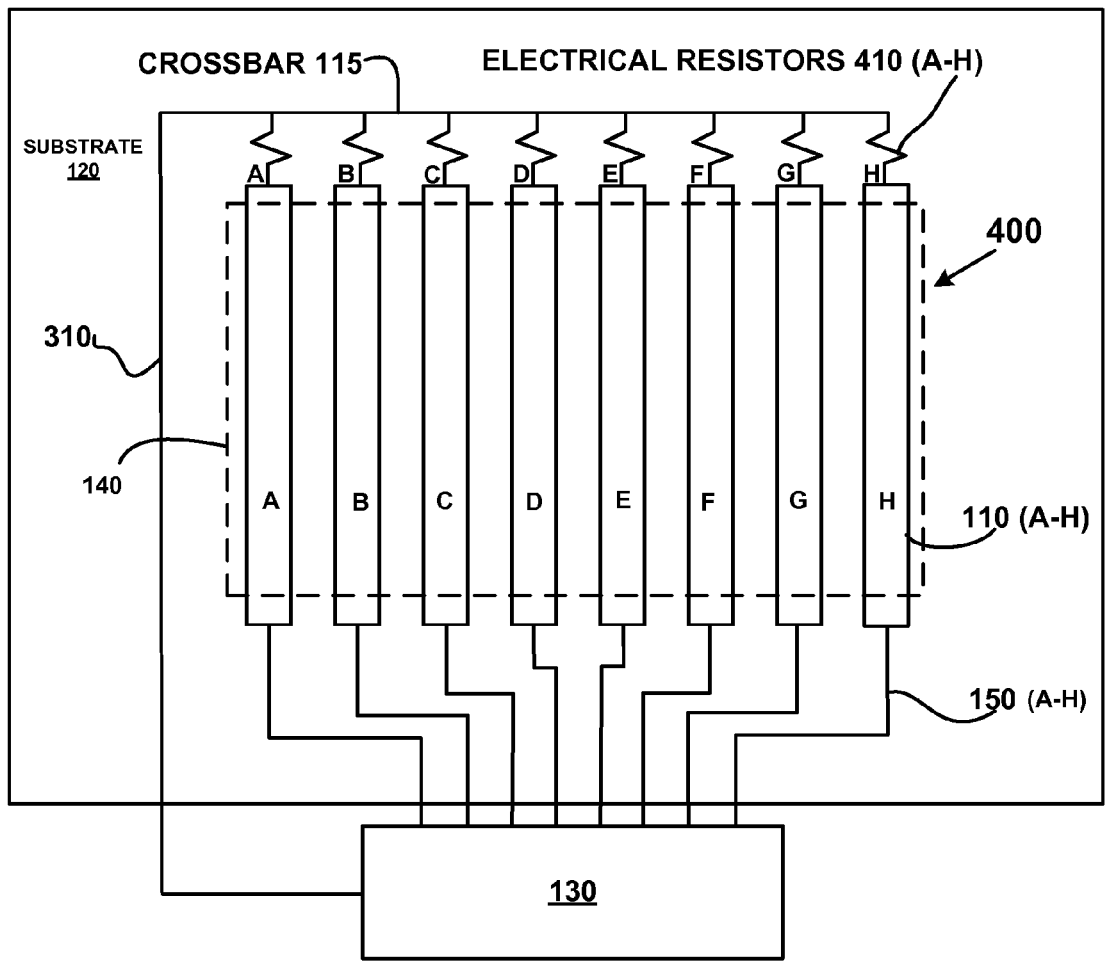
Figure 4:
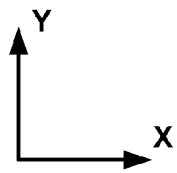

FIG. 4 illustrates elements of an object position sensing apparatus 400 according to another embodiment of the invention. In comparison to the embodiments described above, object position sensing apparatus 400 includes electrical resistors 410A-H that are introduced between the resistive elements 110A-H and the crossbar 115, as shown in FIG. 4. In the example of FIG. 4, crossbar 115 is coupled to circuitry 130 by a common trace 310, described previously herein in conjunction with FIG. 3.

In one embodiment, the resistances associated with the electrical resistors 410A-H of FIG. 4 are less than the resistances associated with the resistive elements 110A-H. In one such embodiment, the resistances associated with the electrical resistors 410A-H are at least a significant fraction of the resistances associated with the resistive elements 110A-H. For example, the resistances associated with the electrical resistors 410A-H may be on the order of about one-half the resistances associated with the resistive elements 110A-H. The addition of the electrical resistors 410A-H makes it easier to determine the x-position of an object that is located near the ends of the resistive elements 110A-H closest to crossbar 115. In one embodiment, the electrical resistors 410A-H and the resistive elements 110A-H are made of the same material, but the resistances associated with the electrical resistors 410A-H are made different from the resistances associated with the resistive elements 110A-H by appropriate patterning of the material.

Figure 5A:
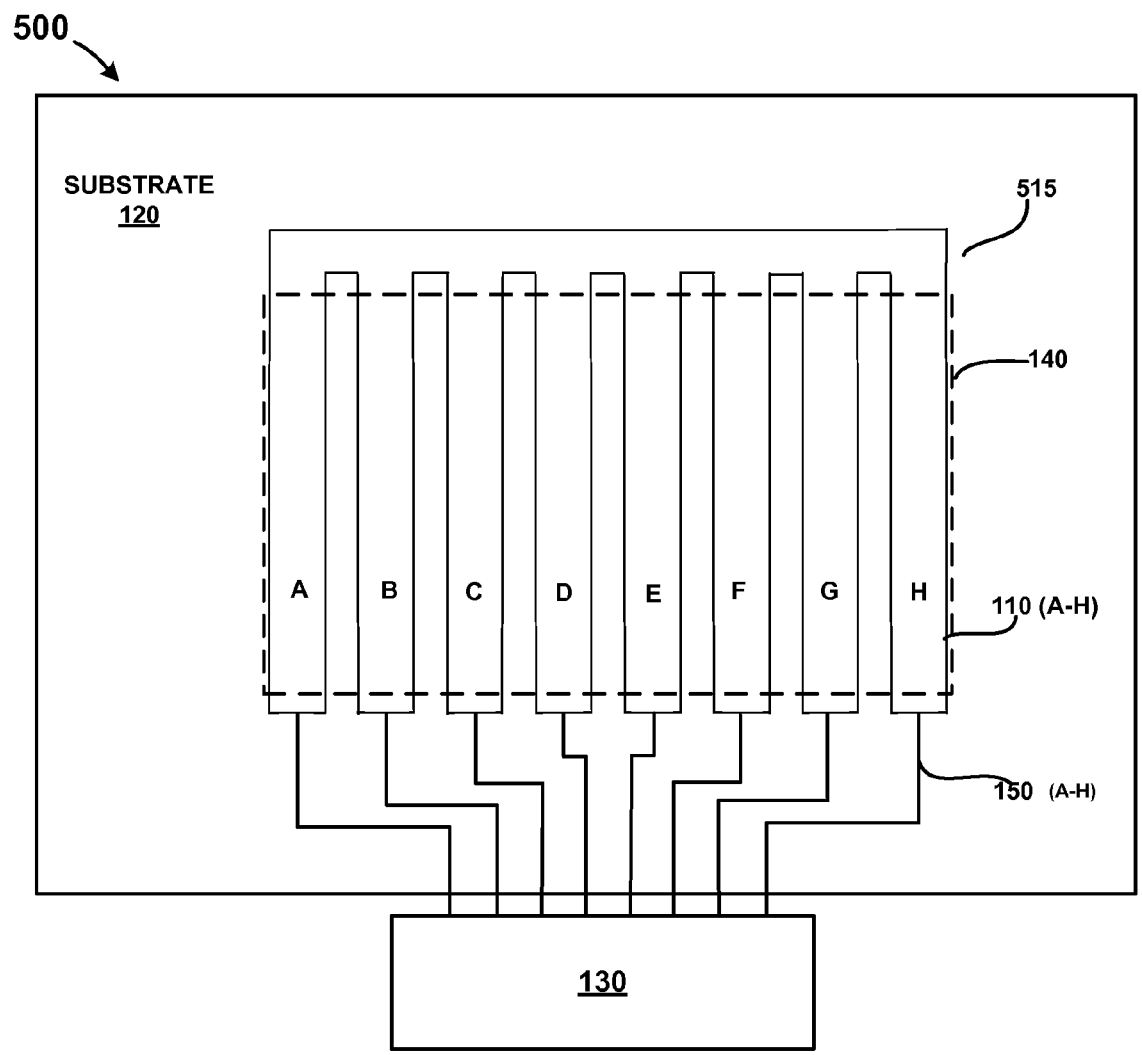
Figure 5A:
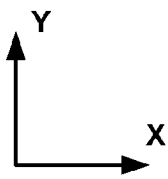

FIG. 5A illustrates elements of an object position sensing apparatus 500 according to another embodiment of the invention. In the example of FIG. 5A, the crossbar 515 is situated outside of the defined sensing region 140. As shown, resistive elements 110A-H are coupled with traces 150A-H and circuitry 130. In one embodiment, the resistive elements 110A-H and crossbar 115 are constructed from the same material, indium tin oxide (ITO), and the substrate 120 is made of polyethylene terephthalate (PET); however, the present invention is not so limited. As described herein, the resistive elements 110A-H and crossbar 115 can be constructed from a single, patterned layer of resistive material deposited on an insulating substrate 120 using, for example, standard lithographic techniques. Such construction may be preferred, for example, for cost and transparency reasons.

It is recognized that, in the example of FIG. 5A, the resistive elements predominantly located near the edges of sensing region 140 (e.g., resistive elements 110A and 110H) may behave differently than the resistive elements predominantly located near the center of sensing region 140 (e.g., resistive elements 110D and 110E). For example, if an input object is at or near the upper-left corner of the projection shown for sensing region 140 (e.g., at resistive element 110A), then the charge from the most distant resistive element (e.g., resistive element 110H) must flow through a resistance (R1) that is greater than the resistances faced by the charges from the other resistive elements. This is because the charge from resistive element 110H must traverse a longer segment of crossbar 115 than that of any other resistive element. But if an object is at the top-middle portion of sensing region 140 (e.g., between resistive elements 110D and 110E), then the charges from the most distant resistive elements (e.g., resistive elements 110A and 110H) must still flow through a resistance (R2) that is greater than that faced by the other resistive elements but less than that of the preceding example (R2 is less than R1). Thus, in the example of FIG. 5A, the amount of charge transferred into a resistive element near the position of an object is not independent of the position of that object along the x-axis of sensing region 140. Correction factors can be determined and applied to compensate for this effect. For example, one or more correction factors based on the measured position in the x-direction may be applied in order to compensate for the influence, if any, of the resistive crossbar 115 on the determination of the y-coordinate. Alternately, a separate conductor can be added to object position sensing apparatus 500 to connect the two ends of crossbar 115, as described further in conjunction with FIG. 5B below.

Figure 5B:
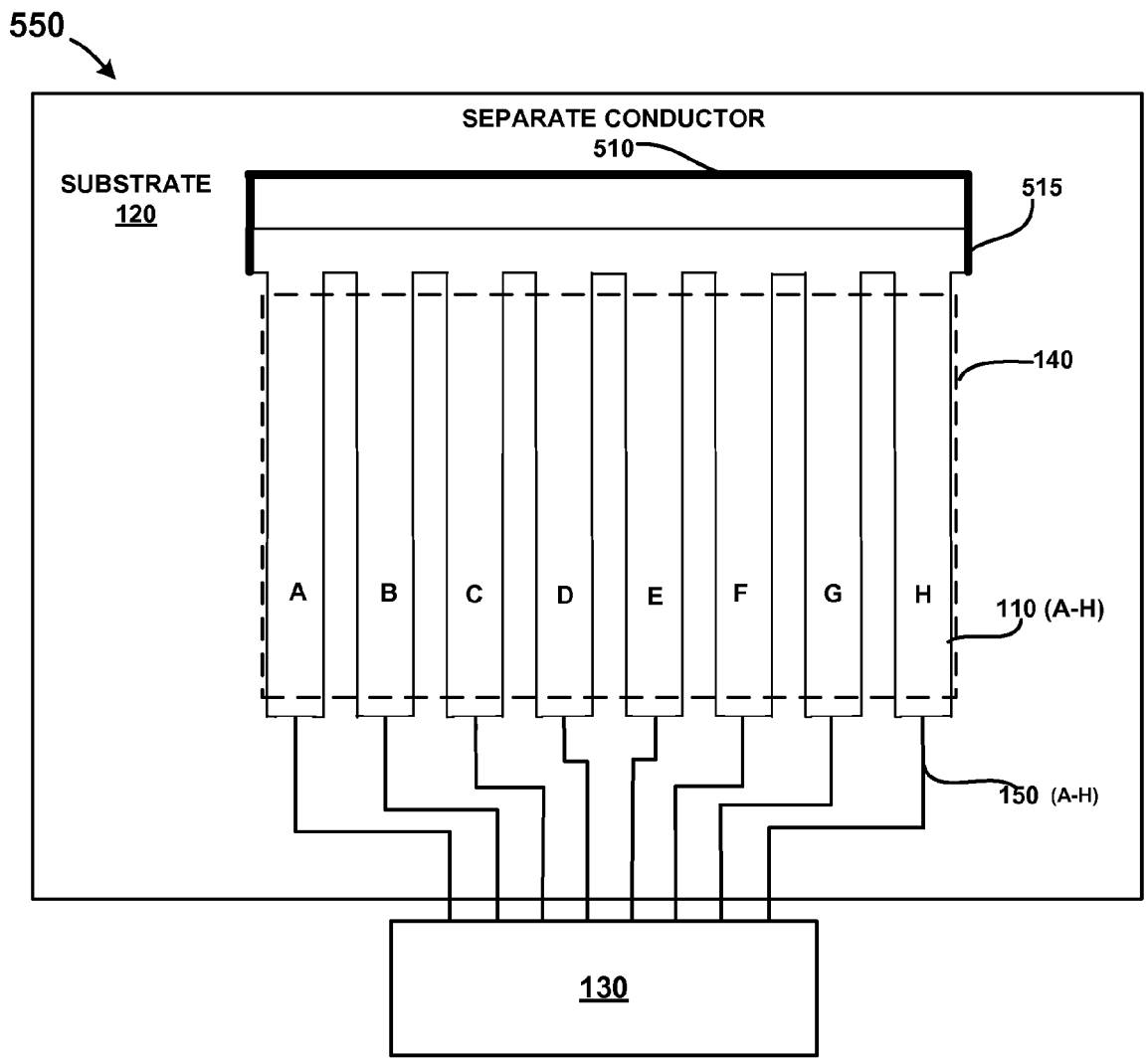

FIG. 5B illustrates elements of a symmetrical object position sensing apparatus 550 according to yet another embodiment of the invention. In the example of FIG. 5B, the crossbar 515 is extended beyond the outermost resistive elements (e.g., resistive elements 110A and 110H). In one embodiment, the crossbar 515 extends beyond the outermost resistive elements by an amount equal to half the distance between adjacent resistive elements.

In the example of FIG. 5B, separate conductor 510 connects two end portions of crossbar 515 as shown, forming an electrical loop with the crossbar. Although FIG. 5B shows the separate conductor 510 as being connected to the edges of the end portions of crossbar 510, it is understood that connecting to other parts of the end portions are possible. For example, it may be desirable in some cases to connect to the end portions of crossbar 510 that are inset from the edges, such as for manufacturing reasons. That is, end portions of crossbar 515 may extend beyond the connections points of separate conductor 510 in some embodiments. In one embodiment, conductor 510 is made of a highly conductive material such as copper, silver ink, or carbon ink.

Consequently, in the example of FIG. 5B, the resistance between the ends of the outermost resistive elements closest to the crossbar 515 (e.g., the ends of the resistive elements 110A and 110H) is, under ideal circumstances, equal to the resistance between any two adjacent resistive elements. Thus, the addition of a separate conductor 510 that electrically couples to two ends of the conductive crossbar 515 establishes an electrical path such that an electrical resistance between a first resistive element and a second resistive element adjacent to the first resistive element is substantially the same as an electrical resistance between the first resistive element and a third elongate resistive element. For example, the resistance between resistive elements 110A and 110H is, under ideal circumstances, equal to the resistance between resistive elements 110A and 110B (or between any other pair of adjacent resistive elements). In effect, by virtue of separate conductor 510, the outermost resistive elements 110A and 110H behave as if they are adjacent although they are physically separated by the width of sensing region 140. Extending the ends of crossbar 515 may be useful to produce an effective resistance between the ends of the outermost elements that is closer to that of adjacent resistive elements, even if these resistances are not identical.

Figure 1F:
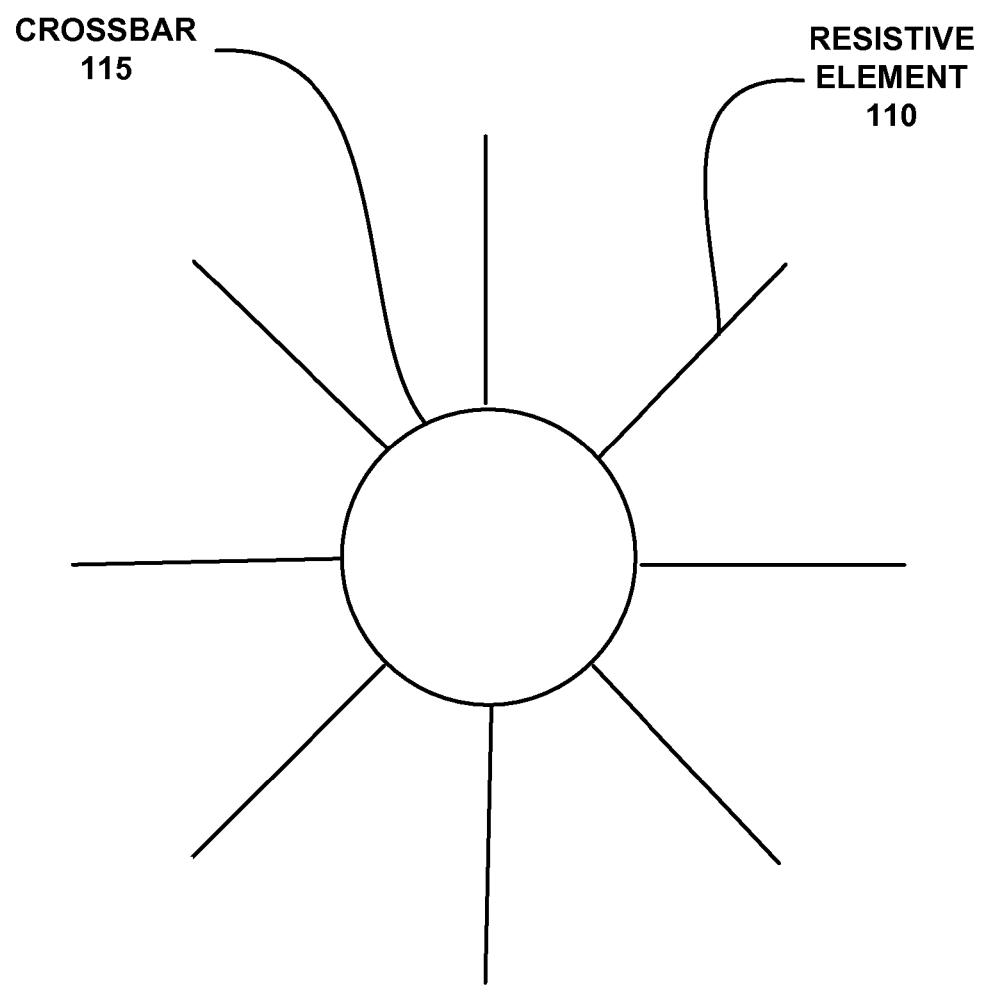

Thus, from the perspective of electrical resistance, the x-axis of object position sensing apparatus 550 possesses symmetry. (It should be appreciated that the star-shaped versions of object position sensing apparatus 550, such as those adopting layouts as shown in FIGS. 1E and 1F, already possess the desired symmetry.) Regardless of the position of an object along the x-axis of sensing region 140, the charge flow is split consistently between the resistive elements on either side of the object. In other words, for example, if an object is located above resistive element 110A in sensing region 140, charges from resistive elements 110B-D will flow through crossbar 515 to the object's position, and charges from resistive elements 110F-H will flow through conductor 510 to the object's position In one embodiment, a shield (not shown) can be placed around conductor 510 to shield conductor 510 from extraneous (external) fields. The shield can be held at a constant voltage, or a varying guard signal can be supplied to the shield by circuitry 130 or by another source. The shield can comprise one or more shield electrodes, or any other appropriate pattern for the desired shielding.

Also, it is recognized that the resistive elements toward the edges of the sensing region 140 (e.g., resistive elements 110A and 110H) may behave differently than the remainder of the resistive elements 110B-G, because resistive elements 110A and 110H are physically adjacent to only one resistive element while the other resistive elements are physically adjacent to two resistive elements each. As described before, correction factors can be determined and applied to compensate for this effect. Alternately, guard resistive elements can be added on either side of the plurality of resistive elements 110A-H, near edges of sensing region 140, as described further in conjunction with FIG. 6 below.

Figure 6:
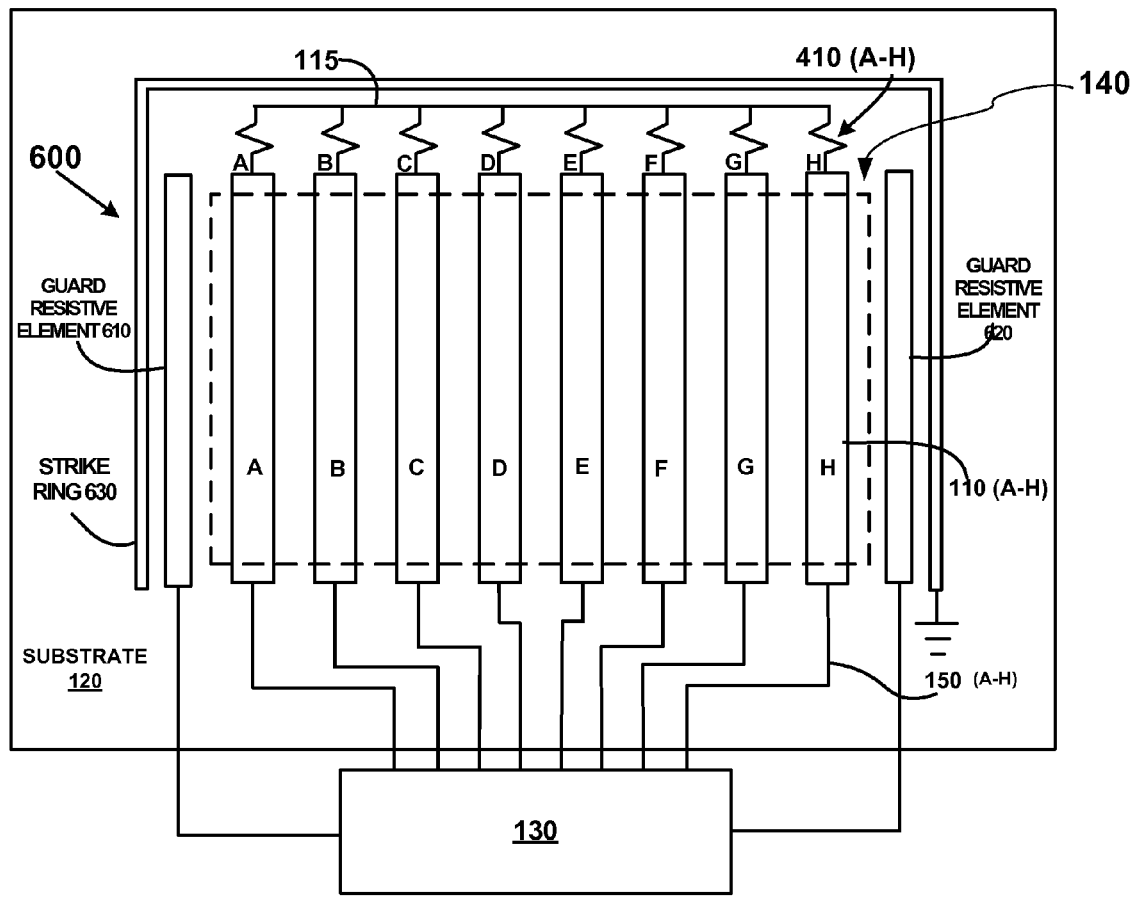

FIG. 6 illustrates elements of an object position sensing apparatus 600 according to another embodiment of the invention. Object position sensing apparatus 600 includes a first guard resistive element 610 on one side of (and outside of) sensing region 140, and a second guard resistive element 620 on the other side of (and outside of) sensing region 140. In the FIG. 6 embodiment, each resistive element 110A-H forming a sensor electrode is physically adjacent to two other resistive elements (either another resistive element of a sensor electrode or a guard resistive element). Accordingly, by driving the guard resistive elements 610 and 620 appropriately, the edge resistive elements (e.g., resistive elements 110A and 110H) can be made to experience a more similar (or even the same) electrical environment as the inner resistive elements (e.g., resistive elements 110B-G). A strike ring 630, which protects the circuitry from electrostatic discharge by providing a low-impedance path to ground, may also be added.

Various features associated with different embodiments of object position sensing apparatuses are described above in conjunction with FIGS. 1-6. An object position sensing apparatus may utilize any possible combination of those features.

To summarize, only a single comb-shaped sensor is needed in order to unambiguously determine an object's position in two dimensions within a sensing region, even at the edges and in any corners of a projection of the sensing region. Accordingly, all of the routing from the resistive elements to the associated circuitry can be accomplished along a single edge of the sensor. This feature is particularly advantageous in smaller (e.g., handheld) devices such as cell phones.

Moreover, the resistive elements A-H described above can be constructed from a single patterned layer of material instead of two patterned layers and an intervening insulating layer, reducing the number of fabrication steps as well as the potential for defects, thereby reducing manufacturing costs.

Manufacturing costs can be further reduced because the sensors can be readily tested during manufacture by performing a continuity check through the traces 150A-H. In fact, circuitry 130 can include electronics that can perform sensor tests, so that failures can be detected once the sensors are in use.

Because the resistive elements can be implemented in a single layer, embodiments described herein lend themselves not only to improved opaque touchpads, but also to improved transparent sensor systems for touch screens. For example, where materials shown on a display needs to be viewable through parts of the sensor array, those parts can be made substantially transparent through appropriate selection of materials and manufacturing methods. Parts that can be made substantially transparent can include applicable portions of resistive elements and substrate, which can be made from a multitude of materials. Specific examples include PET and ITO. Further, the sensor devices described herein can be mounted on a surface (e.g., the screen overlay or the screen top glass) of a display device such as a computer system monitor. In comparison to conventional capacitance sensing apparatuses, a user can view the underlying display through only a single layer of resistive elements instead of two layers of resistive elements and an intervening insulation layer, reducing optical distortion.

The sensors described herein can be utilized under thick or thin face sheets. In addition, in contrast to a more conventional RC (resistor-capacitor) sheet sensor, a smaller object such as finger is more likely distinguished from a larger object such as a hovering palm based on the charge profile across the resistive elements. For example, a hovering palm will, in general, have a more uniform effect on a larger number of resistive elements while a finger will have a more localized effect.

FIG. 7 is a flowchart 700 of a method for sensing a position of an object according to an embodiment of the invention. Although specific steps are disclosed in flowchart 700, such steps are examples. That is, some embodiments perform subsets or supersets of the steps or variations of the steps recited in flowchart 700. The steps in flowchart 700 may be performed in an order different than presented. In one embodiment, flowchart 700 can be implemented by an object position sensing apparatus such as those described above.

In block 710, a voltage change is applied concurrently to a plurality of resistive elements (e.g., sensor electrodes) that form portions of a comb-shaped sensor.

In block 720, the change in electrical charge per resistive element for the plurality of resistive elements is determined. As discussed, this can be accomplished through many different ways, including direct measurement of the amount of charge flowing onto each resistive element and extrapolating from measurements taken before steady state is reached.

In block 730, the change in the electrical charge per resistive element is used to determine a position of the object relative to the sensing region along one or more dimensions. Any of the methods described above, individually or in combination, can be used In addition to the steps 710-730 described above, some embodiments will also initialize the system and ascertain correction factors for determining the position of the object in the sensing region. Less likely in operation, and perhaps in manufacture, some embodiments will also test the system for operability (e.g. for electrical continuity).

Many embodiments will also have a separate step to take baseline measurements of electrical charge transferred to each resistive element when the object is not in the sensing region, and subtract this baseline from later measurements of charge transferred to determine the change in the amount of charge transferred due to the object in the sensing region.

Although the above discussion has focused on applying voltage changes and determining the amount of charge flowing to the resistive elements, it is understood that alternatives exist. Different embodiments may include circuitry that concurrently apply an excitation signal to each of a plurality of resistive elements, and determine an electrical effect due to the excitation signal for each of the plurality of resistive elements in a multitude of ways. In many embodiments, the excitation signal comprises a voltage change and the electrical effects comprise amounts of electrical charge flowing to the resistive elements. In such embodiments, the circuitry concurrently applies the excitation signal by concurrently applying the voltage change to each of the plurality of resistive elements and determines an electrical effect for each of the plurality of elongate resistive elements by determining an amount of charge flowing to each of the plurality of elongate resistive elements. In other embodiments, the excitation signal comprises a current (or amount of charge if integrated over time) and the electrical effects comprise changes in voltage. In such embodiments, the circuitry concurrently applies an excitation signal to each of the plurality of elongate resistive elements by supplying a current, and determines an electrical effect for each of the plurality of elongate resistive elements by determining a voltage for each of the plurality of elongate resistive elements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An object position sensing apparatus having a sensing region, said object position sensing apparatus comprising:
   a substrate;
   a conductive crossbar disposed on said substrate;
   a plurality of elongate resistive elements disposed on said substrate, each of said plurality of elongate resistive elements having a first end coupled to said crossbar and a second end; and
   circuitry, therein each of said plurality of elongate resistive elements is coupled to said circuitry at said second end, and wherein said circuitry is configured for
     concurrently applying a voltage change to each of said plurality of elongate resistive elements, and
     determining an amount of charge flowing to each of said plurality of elongate resistive elements due to said voltage change.

2. The apparatus of claim 1 further comprising a common trace coupled with said conductive crossbar and said circuitry.

3. The apparatus of claim 2 wherein said circuitry is further configured to determine a position of said object in a first dimension of said sensing region by comparing a variation in a total amount of charge flowing to said plurality of resistive elements without flowing through said common trace with a variation in a total amount of charge flowing through said common trace to said plurality of resistive elements.

4. The apparatus of claim 1 wherein said circuitry is further configured for determining a position of said object in a first dimension of said sensing region based on said amount of charge flowing to each of said plurality of elongate resistive elements.

5. The apparatus of claim 1 wherein said conductive crossbar is made from a same resistive material as said elongate resistive elements.

6. The apparatus of claim 1 further comprising a separate conductor, wherein said separate conductor electrically couples to both a first end portion of said conductive crossbar and a second end portion of said conductive crossbar.

7. The apparatus of claim 6 wherein said separate conductor establishes an electrical path such that an electrical resistance between a first elongate resistive element and a second elongate resistive element adjacent to said first elongate resistive element is substantially the same as an electrical resistance between said first elongate resistive element and a third elongate resistive element non-adjacent to said first elongate resistive element.

8. The apparatus of claim 1 further comprising a guard resistive element disposed adjacent to said plurality of elongate resistive elements.

9. The apparatus of claim 1 further comprising a plurality of electrical resistors coupled between said plurality of elongate resistive elements and said conductive crossbar.

10. The apparatus of claim 9 wherein said electrical resistors and said elongate resistive elements are made of a same resistive material.

11. The apparatus of claim 1 wherein said circuitry is further configured to determine a position of said object in a first dimension of said sensing region by:
    interpolating said position using variations in electrical charge flow due to said object in said sensing region for at least a first elongate resistive element of said plurality of resistive elements and a second elongate resistive element of said plurality of resistive elements, wherein said first resistive element has a greatest change in electrical charge due to said object and said second resistive element is proximate to said first resistive element.

12. The apparatus of claim 1 wherein said circuitry is further configured to determine a position of said object in a first dimension of said sensing region based on a ratio comparing n*K to L, wherein n is a total count of said plurality of elongate resistive elements and K is a variation in said amount of charge flowing to one of said plurality of elongate resistive elements substantially uninfluenced by said object, such that n*k is a product of these two values, and wherein L substantially totals all variations in said amounts of charge flowing to each of said plurality of resistive elements.

13. The apparatus of claim 1 wherein said circuitry is also operable for one of testing said plurality of elongate resistive elements for electrical continuity and ascertaining correction factors for determining a position of an object in said sensing region.

14. The apparatus of claim 1 wherein said substrate and said plurality of elongate resistive elements are transparent.

15. An object position sensing apparatus having a sensing region, said object position sensing apparatus comprising:
    a substrate; and
    a comb-shaped sensor array disposed on said substrate, said comb-shaped sensor array comprising:
        a conductive crossbar;
        a plurality of resistive elements, wherein a first end of each of said plurality of resistive elements is electrically coupled with said conductive crossbar; and
        circuitry, wherein a second end of each of said plurality of resistive elements is electrically coupled to said circuitry, and wherein said circuitry is configured for concurrently applying an excitation signal to each of said plurality of resistive elements, and
        determining an electrical effect due to said excitation signal for each of said plurality of resistive elements.

16. The electronic system of claim 15, wherein said circuitry of said object position sensing apparatus is configured to concurrently apply an excitation signal to each of said plurality of resistive elements by applying a voltage change, and wherein said circuitry of said object position sensing apparatus is configured to determine an electrical effect for each of said plurality of resistive elements by determining an amount of charge flowing to each of said plurality of resistive elements.

17. The electronic system of claim 15, wherein said circuitry of said object position sensing apparatus is configured to concurrently apply an excitation signal to each of said plurality of resistive elements by supplying a current, and wherein said circuitry of said object position sensing apparatus is configured to determine an electrical effect for each of said plurality of resistive elements by determining a voltage for each of said plurality of resistive elements.

18. The apparatus of claim 15 further comprising a common trace coupled to both said crossbar and said circuitry.

19. The apparatus of claim 15 further comprising a separate conductor that electrically couples a first end portion of said crossbar to a second end portion of said crossbar.

20. The apparatus of claim 15 further comprising a guard resistive element disposed on said substrate, wherein said guard resistive element is disposed proximate to said plurality of resistive elements.

21. The apparatus of claim 15 further comprising a plurality of electrical resistors coupled between said plurality of resistive elements and said crossbar.

22. The apparatus of claim 15 wherein said circuitry is further configured for determining a position of an object in said sensing region by:
    determining changes in said electrical effect caused by said object for at least two resistive elements of said plurality of resistive elements, and
    interpolating said position using said changes.

23. The apparatus of claim 15 wherein said circuitry is further configured for determining a position of an object in said sensing region by:
    determining changes in said electrical effect caused by said object for at least two resistive elements of said plurality of resistive elements, and
    identifying a location of greatest electrical effect change as said position.

24. The apparatus of claim 15 wherein said circuitry is further configured for determining a position of an object in said sensing region by examining a ratio of changes in said electrical effect due to said object.

25. A method of determining a position of an object proximate to a comb-shaped sensor, said method comprising:
    concurrently applying a voltage change to a plurality of resistive elements that form portions of said comb-shaped sensor;
    measuring a change in electrical charge per resistive element for each of said plurality of resistive elements; and
    using said change in electrical charge per resistive element to determine said position of said object relative to a sensing region.

26. The method of claim 25, further comprising:
    ascertaining correction factors for determining said position of said object in said sensing region.

27. The method of claim 25 wherein using said change in electrical charge per resistive element to determine said position of said object relative to said sensing region comprises:
  interpolating said position using said change in electrical charge per resistive element for at least a first resistive element of said plurality of resistive elements and second resistive element of said plurality of resistive elements, wherein said first resistive element has a greatest change in electrical charge due to said object and said second resistive element is proximate to said first resistive element.

28. The method of claim 25 wherein using said change in electrical charge per resistive element to determine said position of said object relative to said sensing region further comprises:
  identifying a location of estimated greatest change in electrical charge due to said object a said position.

29. The method of claim 25 wherein using said change in electrical charge per resistive element to determine said position of said object relative to said sensing region further comprises:
  examining a ratio involving said change in electrical charge per resistive element.

30. The method of claim 29, wherein determining said position along a second dimension by examining a ratio involving said change in electrical charge per resistive element comprises:
  comparing n*K to L, wherein n is a total count of said plurality of resistive elements and K is a change in electrical charge for one of said plurality of resistive elements substantially uninfluenced by said object, such that n*k is a product of these two values, and wherein L substantially totals all changes in electrical charge per resistive element for said plurality of resistive elements.

31. The method of claim 29, wherein determining said position along a second dimension by examining a ratio involving said change in electrical charge per resistive element comprises:
  comparing a total amount of charge flowing to said plurality of resistive elements without flowing through said common trace with a variation in a total amount of charge flowing through said common trace to said plurality of resistive elements.

32. An electronic system comprising:
  a processor;
  a memory coupled to said processor; and
  an object position sensing apparatus coupled to said processor and having a sensing region, said object position sensing apparatus comprising:
    a substrate,
    a plurality of elongate resistive elements disposed on said substrate,
    a crossbar connected to said plurality of resistive elements, wherein a first end of each of said plurality of resistive elements is coupled to said crossbar, and
    circuitry, wherein a second end of each of said plurality of resistive elements is coupled to said circuitry, and wherein said circuitry is configured to
      concurrently apply an excitation signal to each of said plurality of elongate resistive elements,
      determine an electrical effect for each of said plurality of elongate resistive elements due to said excitation signal, and
      determine a position of an object in said sensing region based on changes in said electrical effect due to said object.

33. The electronic system of claim 32, wherein said object position sensing apparatus is substantially transparent, said electronic system further comprising:
  a display device positioned under said object position sensing apparatus such that material shown by the display device is viewable through said object position sensing apparatus.

* * * * *

UNITED STATES PATENT AND TRADEMARK OFFICE
CERTIFICATE OF CORRECTION

| | | |
|---|---|---|
| PATENT NO. | : 8,120,371 B2 | Page 1 of 1 |
| APPLICATION NO. | : 12/163678 | |
| DATED | : February 21, 2012 | |
| INVENTOR(S) | : Shawn P. Day, David Ely and Bob Lee Mackey | |

It is certified that error appears in the above-identified patent and that said Letters Patent is hereby corrected as shown below:

Col. 12, Line 51, Claim 1: Delete "therein"
and insert -- wherein --

Col. 15, Line 16, Claim 28: Delete "a"
and insert -- at --

Signed and Sealed this
Tenth Day of April, 2012

David J. Kappos
*Director of the United States Patent and Trademark Office*